Patented Aug. 11, 1936

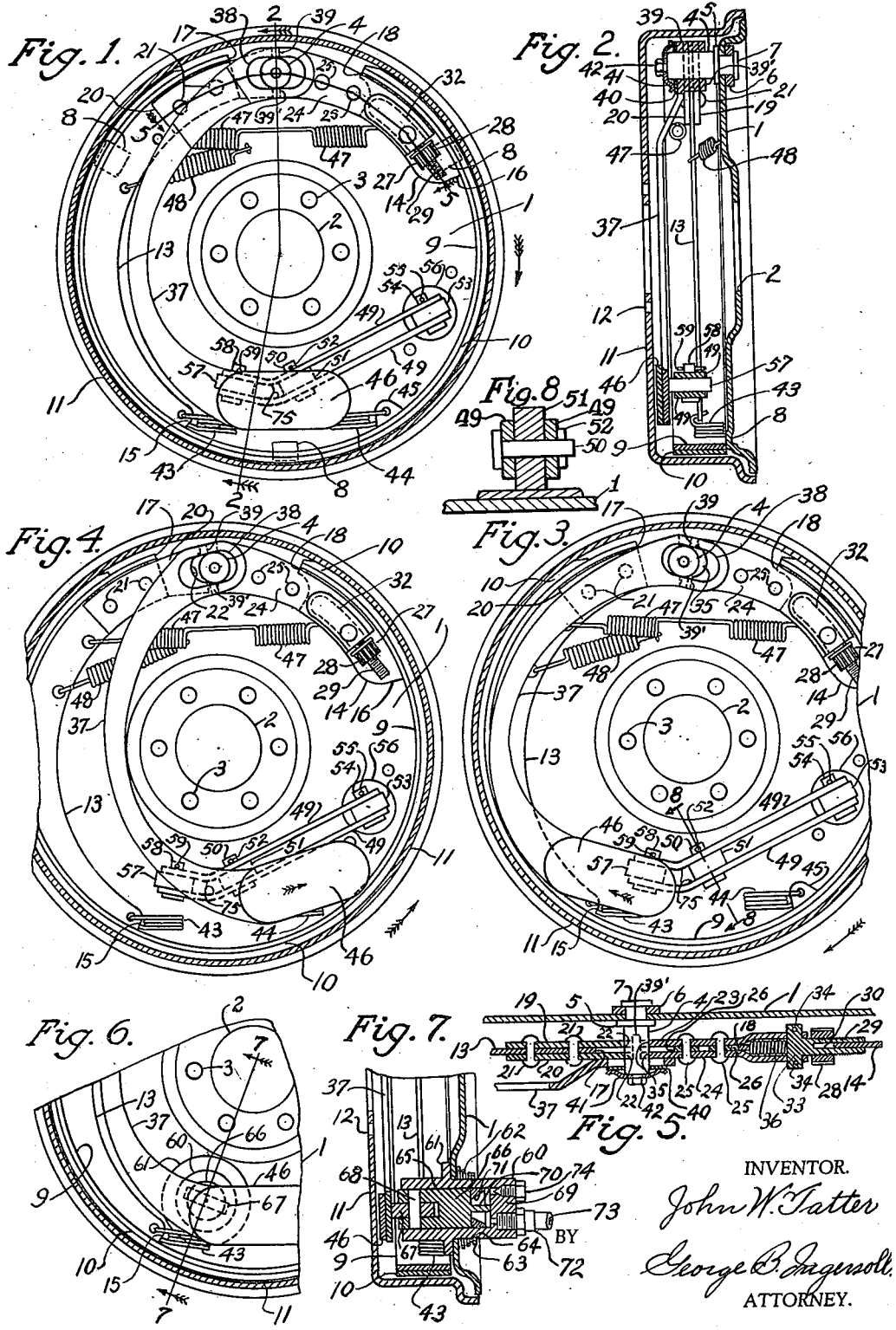

2,050,902

UNITED STATES PATENT OFFICE 2,050,902

BRAKE MECHANISM

John W. Tatter, Detroit, Mich., assignor to Bendix Products Corporation, South Bend, Ind., a corporation of Indiana Application March 17, 1933, Serial No. 661,235

5 Claims. (Cl. 188—140)

My invention relates to improvements in brakes having shoe members actuated to engagement with a drum; and the objects of my improvement are, first, to provide a brake mechanism having a uniform rate of efficiency of operation relative to operative movement of a manually operable means for actuating the brake mechanism; second, to provide a brake mechanism having a booster or pressure accentuating means within the brake mechanism; third, to provide a brake mechanism having a booster or accentuating means actuated by engagement with a portion of the brake mechanism having a lever mechanism having a length extending throughout the greater portion of the diameter of a brake drum forming a portion of the brake mechanism; fifth, to provide a brake operating lever provided with a friction lining member engaged by a movably mounted member; sixth, to provide a brake operating lever having an operative movement in a plane extending approximately at right angles to the axis of the brake mechanism; seventh, to provide a brake operating lever actuated by a movably mounted member including a roller member; eighth, to provide a brake shoe anchor member engaged by a brake lever operating member; ninth, to provide a pivotally mounted member extending between a pair of brake shoe end portions; and tenth, to provide a brake mechanism having a lever member operated by an actuating mechanism extending through the backing plate of the brake mechanism. I attain these objects by mechanism illustrated in the accompanying drawing, in which;

Figure 1 is a view of my brake mechanism in the right rear wheel of an automotive vehicle with the flange portion of the brake drum cut away, said brake mechanism being disclosed in its neutral positions; Fig. 2, a sectional view of the brake mechanism on the line 2—2, Fig. 1; Fig. 3, a view of the brake mechanism shown in Fig. 1, said brake mechanism being disclosed in its forward on position; Fig. 4, a view of the brake mechanism shown in Fig. 1, said brake mechanism being disclosed in its reverse on position; Fig. 5, a sectional view taken on the line 5—5, Fig. 1; Fig. 6, a partial view of the brake mechanism shown in Fig. 1, said brake mechanism being disclosed with a hydraulic actuator unit instead of actuator mechanism to be operated by a lever and cable or rod means as disclosed in Fig. 1; Fig. 7, a sectional view taken on the line 7—7, Fig. 6, and Fig. 8, a sectional view taken on the line 8—8, Fig. 3.

Similar numerals refer to similar parts throughout the several views.

The backing plate 1 is provided with the opening 2 for fitting around the housing of an axle assembly (not shown), the backing plate being suitably secured in an anchored position by rivets or bolts within the holes 3. The anchor pin 4 is provided with the shoulder 5 abutting the backing plate 1, the anchor pin 4 extending through the backing plate 1 and the washer 6, the end 7 of the anchor pin 4 being riveted over to secure it in position. The backing plate 1 is provided with a plurality of offset or raised portions, one of which is disclosed in section at 8 in Fig. 2, to provide a surface for contacting the side of the brake shoe 9 which is provided with the lining 10, which is constructed of the usual friction material, for engaging the inside surface of the brake drum 11, which is provided with the holes 12 through which may extend suitable members for attaching the brake drum 11 to the hub of an automotive wheel (not shown). The brake shoe 9 is constructed of a T-shaped section having the web portions 13 and 14 which are cut away between the ends 15 and 16, thereof to render the brake shoe 9 resilient. It is to be noted that the web portion 13 has a cross section which decreases in area from its end 17 to its end 15, the vertical height of the web portion 13 being gradually decreased to accomplish this feature. It is to be noted that the web portion 14 may also have its cross section decreased, if desired, between its ends 18 and 16, in a manner similar to that of the web portion 13 and the brake shoe 9 to decrease the weight of the brake shoe assembly.

The extension members 19 and 20 are secured to the end 17 of the web portion 13 of the brake shoe 9 by the rivets 21, the extension members 19 and 20 being each provided with the semi-circular surfaces 22 for engaging the anchor pin 4.

The adjustment members 23 and 24 are secured together by the rivets 25 the adjustment members 23 and 24 being separated by the spacer members 26, the adjustment members 23 and 24 extending adjacent and slidably engaging the sides of the web portion 14. The web portion 14 is provided with the opening 27 through which extends the adjusting nut 28 which is threadably supported on and engages the adjusting member 29 which is provided with the slot 30 in which extends the web portion 14, the web portion 14 thus restraining the adjusting member 29 from turning when the adjusting nut 28 is revolved for adjusting the brake shoe 9. The web portion 14 is provided with the slot 32 in which slides the head 33 of the adjusting member 29, the head 33 extending transversely through each of the adjustment members 23 and 24 on each side of the web portion 14, the adjustment members 23 and 24 being retained on the head 33 by the cotter pins 34. The slot 32 and the opening 27 in the web portion 14 are suitably connected by an opening to permit the adjusting member 29 to extend therethrough.

The adjustment members 23 and 24 are each provided with the semi-circular surfaces 35 for engaging in the anchor pin 4. It is to be noted that the engagement of the semi-circular surfaces 22 and 35 engaging the anchor pin 4 will prevent the brake shoe 9 from moving circumferentially around the brake drum 11, the brake shoe 9 being allowed, however, to expand radially throughout its length to cause the brake lining 10 to engage the inside of the brake drum 11.

It is also to be noted that when the adjusting nut 28 is adjustably turned, the brake shoe 9 may be expanded relative to the adjusting members 23 and 24. The spring 36 is interposed between the head 33 of the adjusting member 29 and one end of the slot 32 in the web portion 14, and between the adjusting members 23 and 24, to always maintain the adjusting nut 28 against the sides of the opening 27 to prevent rattles. The arm member 37 is provided with the slot 38 which engages the anchor pin 4, the arm member 37 being further provided with the extension lug 39 which extends between and engages the ends of the extension members 19 and 20 and the adjustment members 23 and 24, said ends being respectively provided with the semi-circular surfaces 22 and 35 for engaging the anchor pin 4. The washer 40 contacts the side of the portion of the arm member 37, which is provided with the slot 38, the washer 40 being held in position by the spider spring 41, the washer 40 and the spider spring 41 being secured by the screw 42 which threadably engages the anchor pin 4. The spring 43 is fastened to the end 15 of the web portion 13 and the spring 44 is fastened to the lug 45 which is suitably connected to the brake shoe 9, the springs 43 and 44 being further connected to the backing plate 1, the springs 43 and 44 together with the spider spring 41 holding the brake shoe 9 in contact with the raised portions 8 of the backing plate 1. The spider spring 41 further maintains the arm member 37 from contacting the vertical flange of the brake drum 11 when the brake is in its off position, the arm member 37 being provided with the lining member 46 which may be constructed of material similar to that of the lining 10, the lining member 46 being suitably secured by rivets or similar means to the arm member 37.

The double spring 47 is connected at its ends to the brake shoe 9 and tends to always maintain the semi-circular surfaces 22 and 35 in engagement with the anchor pin 4. The spring 48 is connected, at one of its ends, to the web portion 13 of the brake shoe 9, and at its other end to the backing plate 1.

The lever members 49 are pivotally mounted on the pin 50 which is suitably mounted in the boss of the bracket 51 which is suitably secured to the backing plate 1, as by welding or similar means, the lever members 49 being retained on the pin 50 by the cotter pin 52. The member 53 is pivotally mounted on the pin 54 which extends through the lever members 49 and is retained in position by the cotter pin 55. The member 53 may be provided with a suitable portion for connecting with a cable or rod means (not shown) which may extend through the opening 56 in the backing plate 1, said cable or rod means being suitably connected with the foot pedal or other suitable means (not shown) of an automotive vehicle whereby a pull may be applied to the member 53, the application of said pull to the member 53 causing the lever members 49 to pivotally move about the pin 50 thus causing the roller 57 to engage the arm member 37 which causes the lining member 46 to engage the side of the web portion of the brake drum 11.

The roller 57 is pivotally mounted on the pin 58 which extends through the arm members 49 and is retained therein by the cotter pin 59. To operate the brake mechanism when the automotive vehicle is moving in a forwardly direction, as disclosed in Fig. 3, the brake operating mechanism, such as a brake pedal, is actuated to exert a pull on the member 53, the lever members 49 are pivotally operated to cause the roller 57 to engage the arm member 37 to cause the lining member 46 to engage the brake drum 11, which will by its rotative movement cause the arm member 37 to move to the position, disclosed in Fig. 3, in which the lower extension lug 39' of the arm member 37 will exert a force against the ends of the extension members 19 and 20 which are held against the anchor pin 4 by the engagement of the shoe 9 with the brake drum 11, while the upper extension lug 39 will exert a force against the ends of the extension members 23 and 24 in a forwardly direction. Thus the harder the lining members 46 is actuated to its engaged position with the brake drum 11, the harder will the brake mechanism be caused to force the brake shoe 9 forwardly into engagement with the brake drum 11 and as the semi-circular surface 22 of the extension members 19 and 20 is anchored against the anchor pin 4, the entire lining 10 of the brake shoe 9 will be displaced to engage the brake drum 11. The double spring 47 will tend to maintain the brake shoe 9 and with its lining 10 in its off or disengaged position and the spring 48 will tend to maintain the semi-circular surface 22 in engagement with the anchor pin 4.

When applying the brake with the vehicle moving in a rearwardly direction, as disclosed in Fig. 4, the frictional engagement of the lining 10 with the brake drum 11 will overcome the tension of the spring 48 which tends to maintain the semi-circular surface 22 in engagement with the anchor pin 4, the shoe 9 rotating slightly until the semi-circular surface 35 engages the anchor pin 4, the arm member 37 being actuated, by the engagement of the lining member 46 with the brake drum 10, to move to the position, as disclosed in Fig. 4, the lower extension lug 39' will exert a force against the ends of the adjustment members 23 and 24 which are held against the anchor pin 4, by the engagement of the shoe 9 with the brake drum 11, while the upper extension lug 39 of the arm member 37 will exert a force against the ends of the extension members 19 and 20 in a rearwardly direction, thus causing the rear portion of the brake shoe 9 and its lining 10 to engage the brake drum 11 in a manner similar, but in a reversed direction, to the operation of the brake mechanism, as above described relative to Fig. 3. When it is desired to actuate the arm member 37, to cause the lining members 46 to engage the brake drum 11, by hydraulic means, as disclosed in Figs. 6 and 7, the backing plate 1 is provided with an opening for receiving the hydraulic cylinder 60 which is provided with the flange 61 which is held against the backing plate 1 by the spring 62 which contacts with the backing plate 1 and with the washer 63 which may be constructed with a split portion to permit said washer 63 to be assembled within the groove 64 of the hydraulic cylinder 60. The hydraulic cylinder 60 is provided with the bore 65 in which is slidably mounted the piston 66 provided with a slot in which is rotatably mounted the roller 67 on the shaft 68 suitably secured in the piston 66, the roller 67 engaging the arm member 37 in a similar manner to that of the roller 57.

The hydraulic cylinder 60 is provided with the closed end 69 which is contacted by the extension portion 70 of the piston 66 thus providing a stop for maintaining the piston 66 in its rearmost position.

The piston 66 is provided with the seal member 71 which may be suitably secured to the piston 66, as by vulcanizing or similar means, the tapered wall position of the seal member 71 being adapted to be forced tightly against the bore 65 of the hydraulic cylinder 60 by hydraulic pressure developed in the bore 65. The connection 72 is suitably mounted in the closed end 69 of the hydraulic cylinder 60 and is adapted to deliver hydraulic liquid through suitable passages, in the closed end 69, to the bore 65, the connection 72 being further connected by the conduit 73 with the hydraulic brake system of an automotive vehicle, said hydraulic brake system including pedal and hydraulic pressure inducing means (not shown) for developing pressure in the hydraulic system including the space within the bore 65 of the hydraulic master cylinder 60. The screw 74 may be threadably mounted in the closed end 65 and when removed permits a suitable connection together with conduit means (not shown) to be connected therewith to provide means for bleeding the hydraulic system, the threaded hole for the screw 74 being connected by suitable passages with the bore 65.

The lever members 49 may be bent as at 75 to facilitate the locating of the roller 57 adjacent the arm member 37 and its lining member 46.

It is to be noted that I have invented a brake mechanism that incorporates a booster or accentuating mechanism therein, said booster mechanism causing the brake mechanism to operate very efficiently and uniformly throughout its operating range relative to the movement of a manually operated mechanism such as a pedal or similar means as used in the conventional type of automobile vehicle.

I claim:

1. In a brake, the combination of a brake drum, a shoe member engaging said brake drum, a backing plate, provided with a plurality of raised surfaces, an anchor pin suitably mounted in said backing plate, said anchor pin engaging the ends of said shoe member, a lever member pivoting on said anchor pin, a member for frictionally engaging said brake drum, said last mentioned member being mounted on said lever member, a movably mounted member for actuating said lever member, said movably mounted member including a roller member for engaging said lever member, and resilient means for maintaining said shoe member in engagement with the raised surfaces of said backing plate.

2. In a brake, the combination of an anchor pin suitably mounted, a brake drum, a brake shoe having its ends engaging said anchor pin, said brake shoe engaging said brake drum, and an operating lever pivoting on said anchor pin, said operating lever being provided with extension portions extending between and engaging the ends of said brake shoe, said operating lever being further provided with a boss for engaging said brake drum to increase the effective engagement of said brake shoe with said brake drum.

3. In a brake, the combination of an anchor member, a brake shoe provided with ends engaging said anchor member, a lever member pivoting and said anchor member and having portions extending between the ends of said brake shoe, said portions extending on opposite sides of said anchor member, said portions engaging said brake shoe, and a brake drum revolvably mounted and engaging the end of said lever member, said brake drum being engaged by said brake shoe.

4. In a brake, the combination of a brake drum, a brake shoe member engaging said brake drum, an anchor pin for said brake shoe a lever pivoting on said anchor pin and engaging said brake shoe, said lever being provided with a friction member for engaging said brake drum, a pair of pivotably mounted members, a roller member suitably mounted between said pair of pivotally mounted members and engaging said first mentioned pivotally mounted lever member, and means connected with said pair of pivotally mounted members, said means actuating said pivotally mounted members to cause said roller to engage said first mentioned pivotally mounted member.

5. In a brake, the combination of an anchor member, a shoe member, a brake drum engaging said shoe member, a lever member pivoting on said anchor member and extending on opposite sides of the axis of said brake drum, said lever member being provided with a boss portion, a friction material secured to the boss portion of said lever member, and lever means movably mounted and adapted to engage said first mentioned lever member to cause said friction material to engage said drum to increase the effective engagement of said brake shoe with said brake drum, said lever means loosely engaging said first mentioned lever member to permit said first mentioned lever member to move circumferentially of said brake drum relative to said lever means.

JOHN W. TATTER.

CERTIFICATE OF CORRECTION.

Patent No. 2,050,902.                              August 11, 1936.

JOHN W. TATTER.

It is hereby certified that error appears in the printed specification of the above numbered patent requiring correction as follows: Page 3, second column, line 24, claim 3, for "and" first occurrence, read on; and that the said Letters Patent should be read with this correction therein that the same may conform to the record of the case in the Patent Office.

Signed and sealed this 27th day of July, A. D. 1937.

Henry Van Arsdale (Seal)                                  Acting Commisioner of Patents.